United States Patent
Iwatsuka et al.

(10) Patent No.: US 7,118,156 B2
(45) Date of Patent: Oct. 10, 2006

(54) SUN VISOR FOR VEHICLE

(75) Inventors: Yoshiki Iwatsuka, Toyota (JP);
Takashi Asai, Toyota (JP)

(73) Assignees: Kyowa Sangyo Co., Ltd., Aichi-ken
(JP); Shinwa Seiko Co., Ltd.,
Aichi-ken (JP)

( * ) Notice: Subject to any disclaimer, the term of this patent is extended or adjusted under 35 U.S.C. 154(b) by 0 days.

(21) Appl. No.: 10/981,421

(22) Filed: Nov. 4, 2004

(65) Prior Publication Data

US 2005/0134078 A1    Jun. 23, 2005

(30) Foreign Application Priority Data

Nov. 5, 2003  (JP) ............................. 2003-375716
May 27, 2004  (JP) ............................. 2004-158097

(51) Int. Cl.
*B60J 3/02* (2006.01)

(52) U.S. Cl. ..................................... 296/97.2; 296/97.5
(58) Field of Classification Search ............... 296/97.2, 296/97.5, 97.6, 97.8, 1.11
See application file for complete search history.

(56) References Cited

U.S. PATENT DOCUMENTS 2,894,576 A * 7/1959 Williams ..................... 160/220
4,624,499 A * 11/1986 Flowerday .................. 296/97.5
5,061,004 A * 10/1991 Happich et al. ........... 296/97.5

FOREIGN PATENT DOCUMENTS

DE     35 11 028    * 10/1986
DE     37 27 455    * 3/1989

* cited by examiner

*Primary Examiner*—Dennis H. Pedder
(74) *Attorney, Agent, or Firm*—Conley Rose, P.C.

(57) ABSTRACT

A sun visor for a vehicle may include a sun visor body (10) and a mirror unit (20) attached to the sun visor body (10). The mirror unit (20) may have a rotatable attachment (35) that can rotate along the attached face of the sun visor body (10). Further, the mirror unit (20) may have a mirror holder (22) with a mirror. The mirror holder (22) is rotatably connected around a rotatable axis to the rotatable attachment (35). The rotatable axis may extend along the rotatable face of the rotatable attachment (35). The mirror holder (22) may be displaceable between a stored position along the sun visor body (10), and a used position protruding from the sun visor body (10) at some angle. The mirror of this sun visor is angle-adjusted in two independent directions. The directions are perpendicular to each other. Therefore, it is easy to set a preferable reflecting angle to the mirror and the construction may be simple.

16 Claims, 11 Drawing Sheets

SUN VISOR FOR VEHICLE

BACKGROUND OF THE INVENTION

1. Field of the Invention

The present invention relates to a sun visor with a mirror for vehicle.

2. Description of the Related Art

With regard to a sun visor with a mirror, typically called a vanity mirror, the angle of the mirror is solely adjusted by adjusting the angle of the sun visor body. However, the rotational axis for the sun visor is commonly situated at a top corner of the sun visor body and the mirror is usually mounted at the center of the sun visor body. Therefore, adjustment of the angle of the mirror can involve considerable displacement of the mirror, and this limits the angular viewing range through the mirror. Further, the sun visor body is significantly larger than the mirror, and handling the sun visor body in order to adjust the angle of the mirror is vexatious complication.

In order to solve such a problem, sun visors for vehicles having a displaceable mirror located against the sun visor body have been disclosed, e.g. in Japanese Laid-Open Utility Model Publication No.3-110910, Japanese Laid-Open Utility Model Publication No.2-78412, and Japanese Laid-Open Utility Model Publication No.2-64421. These mirror holders are attached to the sun visor body via a ball joint. In these structures, the adjusting ranges of the angle of the mirror are still limited by factors such as the thickness of the sun visor body.

Recently, there have been increasing safety promotions to use a child-car seat when transporting children. It is desired to be able to easily watch the children from the front seat while they are seated in the child-car seat, which is usually placed on the rear seat. For this purpose, it is thought that one could use the mirror attached to a sun visor. However, in such a situation, the sun visor would be constantly arranged in a used position, i.e., a position used for sun shading, causing the passengers in the vehicle to feel surrounded by the sun visor or to have their outward vision limited.

SUMMARY OF THE INVENTION

Accordingly, one object of the present teachings is to teach an improved sun visor with a mirror for a vehicle that overcomes one or more of the problems of known sun visors with mirrors. For example, in one embodiment of the present teachings, a sun visor with a mirror for a vehicle is taught that has a relatively simple constitution and that allows the adjustment of the angle of the mirror within a wide angular range.

In one aspect of the present teachings, a sun visor for a vehicle may have a sun visor body and a mirror unit attached to the sun visor body. The mirror unit may have a rotatable attachment that enables the mirror to rotate along the attached face of the sun visor body. Further, the mirror unit may have a mirror holder with a mirror. The mirror holder may be rotatably connected to the rotatable attachment via a rotatable axis. The rotatable axis may extend along the rotatable face of the rotatable attachment. The mirror holder may be displaceable between a stored position, adjacent to the sun visor body, and a used position, protruding from the sun visor body at a desired angle.

In accordance with this aspect of sun visor, by rotating the mirror holder about the rotatable axis, the protruding angle of the mirror relative to the rotatable attachment and the sun visor body can be adjusted, i.e. the up-and-down direction of the mirror. Further, by rotating the rotatable attachment against the sun visor body, the protruding direction of the mirror relative to the sun visor body can be adjusted, i.e. the right-and-left direction of the mirror. The rotatable axis of the mirror holder extends along the rotatable face of the rotatable attachment, as a result, a perpendicular angle exists between the rotating direction of the mirror holder and the rotating direction of the rotatable attachment. Consequently, the angled position of the mirror of such a sun visor can be adjusted in two independent directions. The passenger can readily adjust the mirror to a preferable reflecting angle. Moreover, since the mirror holder and the rotatable attachment respectively rotate in only one independent direction each, the construction for enabling the mirror rotation can be simple.

In this specification, the attached face of the sun visor body for the mirror unit is defined as the face on which the mirror will protrude when the mirror is in a used position.

DETAILED DESCRIPTION OF THE INVENTION

Figure 1:
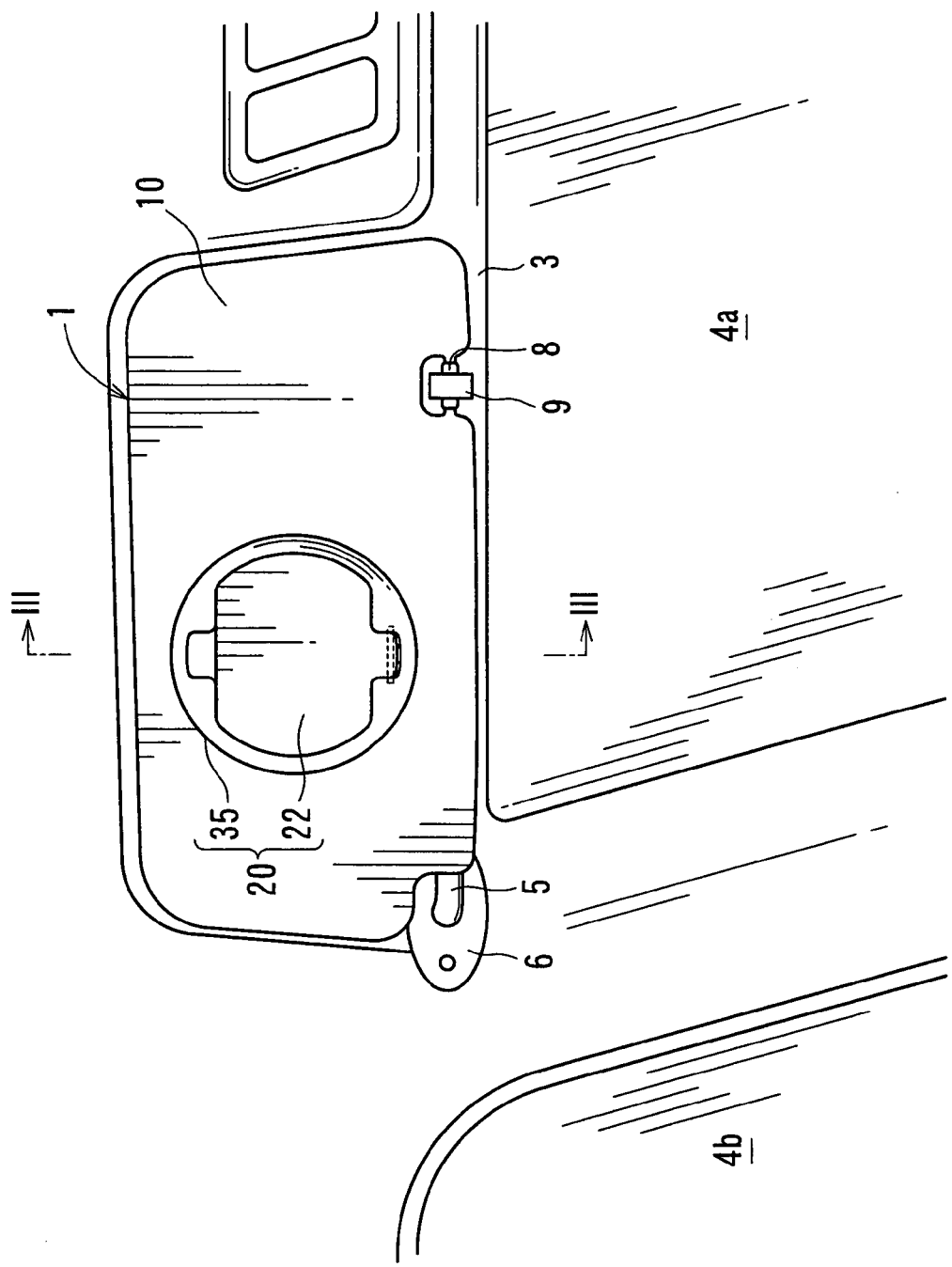
FIG. 1 is a plane view of a representative sun visor for a vehicle according to the present teachings.

An embodiment of the present teachings is shown in FIG. 1. In FIG. 1, the sun visor 1 is attached to the ceiling surface 3 of the vehicle compartment of the front passenger seat. The sun visor 1 is shown arranged at a hold position, where the sun visor is not used as a sunshade. The sun visor 1 may include a bracket 6, a support axis 5, a sun visor body 10, and a mirror unit 20.

The bracket 6 and the support axis 5 may be known components. The support axis 5 is a substantially L-shaped axis member having a part bent to almost perpendicular. The sun visor body 10 is rotatably fixed to the longer axis portion of the support axis 5, which extends relatively longer from the bent portion joining it to the shorter axis portion of the support axis 5. Further, the bracket 6 is rotatably fixed to an edge of shorter axis portion of the support axis 5. The shorter axis portion of the support axis 5 extends relatively shorter from the bent part of the support axis 5 and is extended perpendicular to the plane of the drawing in FIG. 1. The bracket 6 is fastened to the ceiling surface 3 by a known manner applying fixing devices such as screws, pins, or clips. Consequently, the sun visor body 10 is attached to the ceiling surface 3 via the bracket 6 and the support axis 5.

The sun visor body 10 is displaceable between the hold position, i.e., along the ceiling surface 3 (the position shown in FIG. 1), and the shading position, i.e., along the front glass (windshield) 4a, by rotating about the longer axis portion of the support axis 5. Further, the sun visor body 10 can be stably held in the hold positions and any preferable intermediate position for sun shading by known constructions not specifically shown in the figures. By rotating the support axis 5 about the connection to the bracket 6, the sun visor body 10 can move between a position extending approximately parallel to the front glass 4a (i.e., a position extending in the right-and-left direction of the vehicle compartment) and a position along the side glass 4b (i.e., a position extending in the front-and-rear direction).

Figure 3:
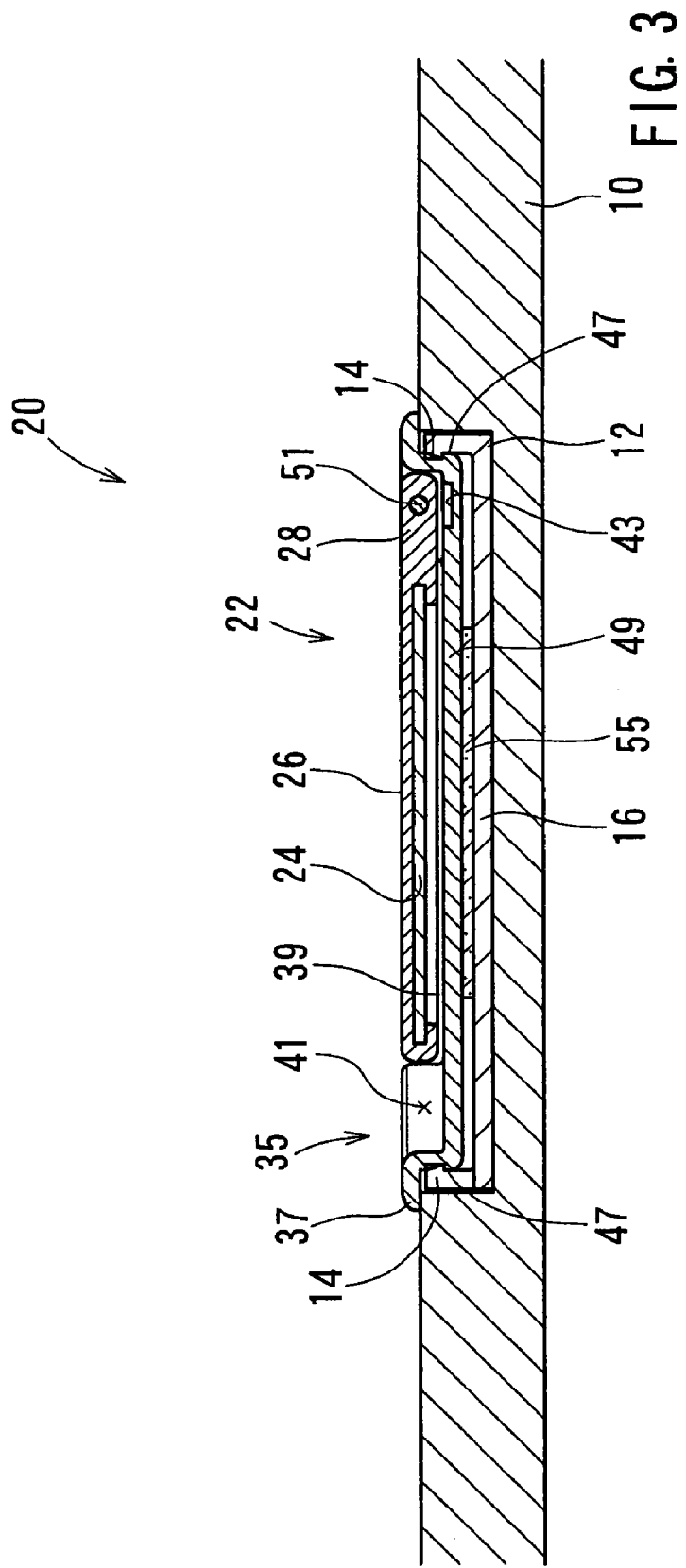
FIG. 3 is a cross-sectional view taken along line III—III in FIG. 1.
Figure 4:
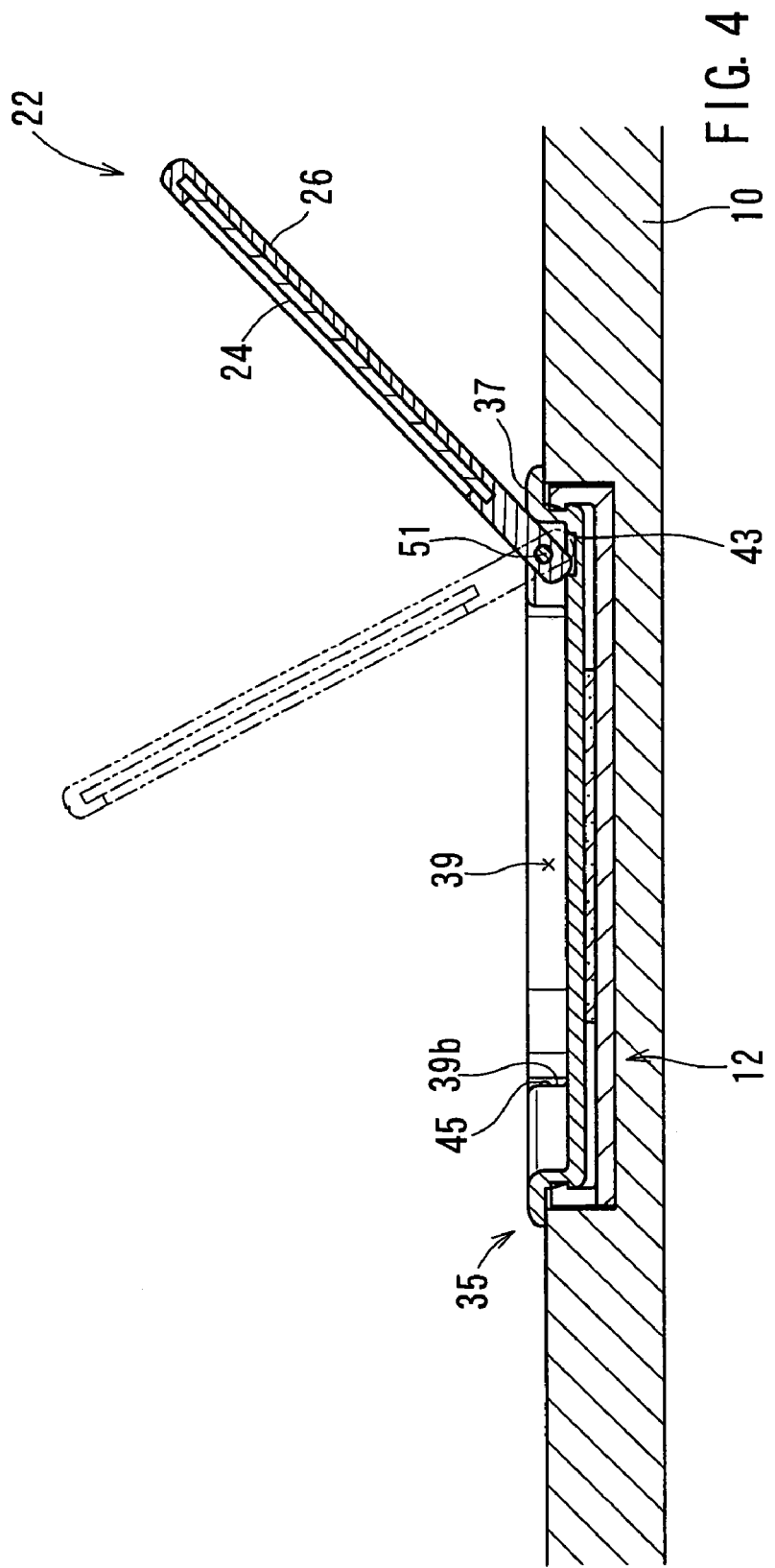
FIG. 4 is a cross-sectional view similar to FIG. 3 but showing the mirror holder in a used position.

The sun visor body 10 is a component functioning as a sunshade and may be formed as a plate-like member. The sun visor body 10 may be a molded component and may be made by known molding methods, for example such as blow molding, injection molding, or forming molding. As shown in FIGS. 3 and 4, the sun visor body 10 is provided with a unit support 12 so as to mount the mirror unit 20. The unit support 12 may be formed as a concave depression on the surface of the sun visor body 10. In the present embodiment, the unit support 12 is formed on the face directly opposing the interior of vehicle compartment when the sun visor 1 is oriented in the hold position, as shown in FIG. 1. This face is defined as the attached face.

Similar to known sun visor bodies, the sun visor body 10 also includes an assist axis 8 on an extension line substantially coincident to the central axis of the longer axis portion of the support axis 5. A hook 9 is provided on the ceiling surface 3 that can rotatably hold the assist axis 8.

The unit support 12 can rotatably hold the rotatable attachment 35 (described afterward) of the mirror unit 20. The unit support 12 is not limited in configuration and can be formed in a variety of shapes. In the present embodiment, as shown in FIG. 3, the unit support 12 is a cylindrical concave component including a bottom part 16. The bottom part 16 is directly opposite to the center part of the rotatable attachment 35. Further, the unit support 12 has several detents 14 protruding inward from the periphery of the unit support 12. The detents 14 may be elastically deformable in an outward direction as well as engageable to the mirror unit 20. When the mirror unit 20 is pushed into the unit support 12, the detents 14 can deform outward elastically, and then resiliently return toward their former position, engaging the mirror unit 20.

The unit support 12 may be integrated to the sun visor body 10 by any desired method. For example, the unit support 12 can be integrally molded with the sun visor body 10, or integrally molded with a core material of the sun visor body 10. Alternatively, the unit support 12 can be molded singly and then inserted when the sun visor body is molded via forming. Further, independently molded unit supports 12 can be integrated with the sun visor body 10 by other known methods such as adhesion, welding, fixing, or interference fitting (i.e., snap fit, etc.).

The mirror unit 20 is provided with a mirror 24. The mirror unit 20 is mounted and exposed on the surface of the sun visor body 10. Hereinafter, the mirror unit 20 will be described in detail. The mirror unit 20 may comprise the mirror holder 22 and the rotatable attachment 35.

Figure 2:
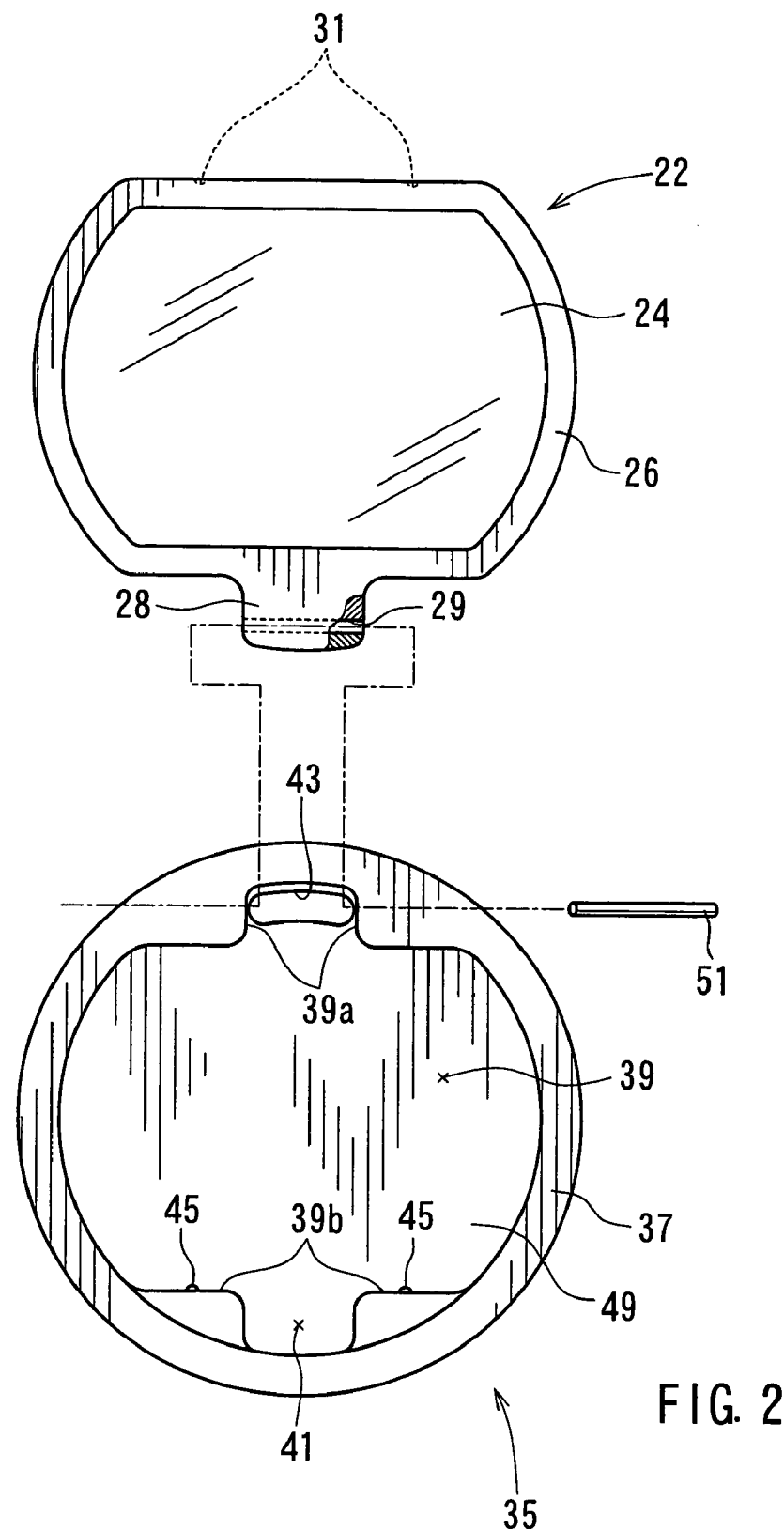
FIG. 2 is an exploded view of the mirror unit shown in FIG. 1.

The mirror holder 22 is rotatably attached to the rotatable attachment 35, and may have a mirror 24 and a cover 26. The mirror holder 22 rotates about an axis substantially parallel to the plane of the sun visor body 10. In the present embodiment, as shown in FIG. 2, the mirror holder 22 is formed as a predominately plate-like member. The mirror 24 is formed in the shape of the central portion of a circular disc cut by two parallel lines. Consequently, the mirror 24 has two opposite straight sides that are parallel with each other, and two opposite sides that are formed in circular arcs each having the same center and the same radius.

The cover 26 covers the circumference and the entire back surface of the mirror 24. The cover 26 has an attached part 28. The attached part 28 is extended from the center section of one straight side of the mirror 24, substantially parallel to the face of the mirror 24. A penetrating tubular channel 29 is formed that extends parallel to the straight side of the mirror 24, laterally through the attached part 28.

Further, engaging concave parts 31 may be provided on the edge of the cover 26, opposite to the side of the attached part 28. The engaging concave parts 31 may be two semi round concave portions formed on the end face of the thickness direction of the cover 26 at a predetermined distance from one another.

The mirror holder 22 is attached to the rotatable attachment 35 and the rotatable attachment 35 is rotatably attached to the sun visor body 10 on the attached surface of the sun visor body 10. As shown in FIGS. 2 and 3, the rotatable attachment 35 is formed as a shallow cylindrical member including a bottom sized so as to be storable in the unit support 12. Further, along the top edge of the cylindrical part of the rotatable attachment 35, there is a flange 37 elongating outward in a radial direction. When the rotatable attachment 35 is attached to the sun visor body 10 as shown in FIG. 3, the flange covers a contact area of the mirror unit 20 to the sun visor body 10.

The rotatable attachment 35 of the present embodiment has a housing part 39 configured to store the mirror holder 22. The housing part 39 is formed as a concave section at an inner area of the cylindrical shape of the rotatable attachment 35. The housing part 39 is a shape corresponding to the outer shape of the mirror holder 22 with a depth approximately the same as the thickness of the mirror holder 22. Further, as shown in FIG. 2, the housing part 39 has an elongated concave part 41 having a similar shape as the attached part 28, located on the side opposite to the side corresponding to the attached part 28 of the mirror holder 22. The elongated concave part 41 enables an operator to insert a finger or fingernail beneath the closed mirror holder 22 in order to open and remove the mirror holder 22 from storage in the housing part 39.

It is not shown, but two penetrating holes are formed on either side of the wall part 39a of the housing part 39. The wall part 39a corresponds to the attached part 28 of the mirror holder 22. When assembled, the position of the two penetrating holes corresponds to the penetrating channel 29 of the attached part 28. As shown in FIGS. 2 and 3, a pin 51 inserted into the penetrating holes and the penetrating channel 29 rotatably attaches the mirror holder 22. Consequently, the mirror holder 22 is rotatably attached to the rotatable attachment 35.

A run out part 43 may be formed as an elliptic concave part in the surface of the bottom part 49 of the housing part 39 directly opposing the attached part 28 of the mirror holder 22. The run out part 43 corresponds to the attached part 28 and allows the rotation of the attached part 28 of the mirror holder 22 without contacting the surface of the bottom part 49 of housing part 39. The run out part 43, as shown in FIG. 4, permits the mirror holder 22 to rotate into the used position.

Further, on the wall part 39b, located on the side surface facing the engaging concave parts 31 of the mirror holder 22, there are two arc shaped engaging convex parts 45. The engaging convex parts 45 are configured so as to engage with the corresponding engaging concave parts 31.

As shown in FIG. 3, the rotatable attachment 35 has an attaching part 47 on the periphery of the cylindrical shape. The attaching part 47 in the present embodiment is formed as a circular ring extending from the periphery of the rotatable attachment 35. The sun visor body 10 retains the attaching part 47 through the interfacing of the detents 14 of the unit support 12. The attaching part 47 may be rotatably slidable along the attached face of the sun visor 10 while under the condition of being fitted with the detents 14.

As shown in FIGS. 3 and 4, a friction increment member 55 may be arranged between the bottom part 49 of the rotatable attachment 35 and the bottom part 16 of the unit support 12. The friction increment member 55 functions to increase the friction force occurring opposing the rotation of the rotatable attachment 35 against the sun visor body 10. The rotatable attachment 35 rotates about an axis substantially perpendicular to the plane of the sun visor body 10. In the present embodiment, the friction increment member 55 is formed of an elastic material made of foamed urethane resin. Due to compression exerted by the bottom part 49 and the bottom part 16, the friction increment member 55 biases the rotatable attachment 35 outward, away from the sun visor body 10. As a result of the biasing by the friction increment member 55, there is an increase in friction between the unit support 12 and the rotatable attachment 35, concentrated between the attaching part 47 and the detents 14. Accordingly, between the rotatable attachment 35 and the friction increment member 55 and/or between the friction increment member 55 and the unit support 12, friction force can occur opposing the rotation of the rotatable attachment 35. The increase in friction force by the friction increment member 55 may inhibit the unintentional rotation caused by such factors as the weight of the mirror holder 22 itself, common vibration of the vehicle interior, and centrifugal force. At the same time, the increase of the friction force may be limited to a level permitting the easy operation of the rotatable attachment 35.

The friction increment member 55 is not limited, but the friction increment member 55 preferably has an elastic component. Known materials with elasticity can be used such as sponge-like foamed resin, rubber, and coil or leaf springs. Using flexible urethane or rubbers having a textile material on the rubbed (contacting) surface is more preferable because sufficient friction force can be created along with noise reduction. Further, the friction increment member 55 may be arranged independently or fixed to either the rotatable attachment 35 or to the unit support 12 by known method such as adhesion.

The method for using the mirror unit 20 of this sun visor for vehicle 1 will hereinafter be described. However, the sun visor body 10 of the sun visor for vehicle 1 can be used as a sunshade in the front or to the side of passenger in the same way as known sun visors.

Figure 5:
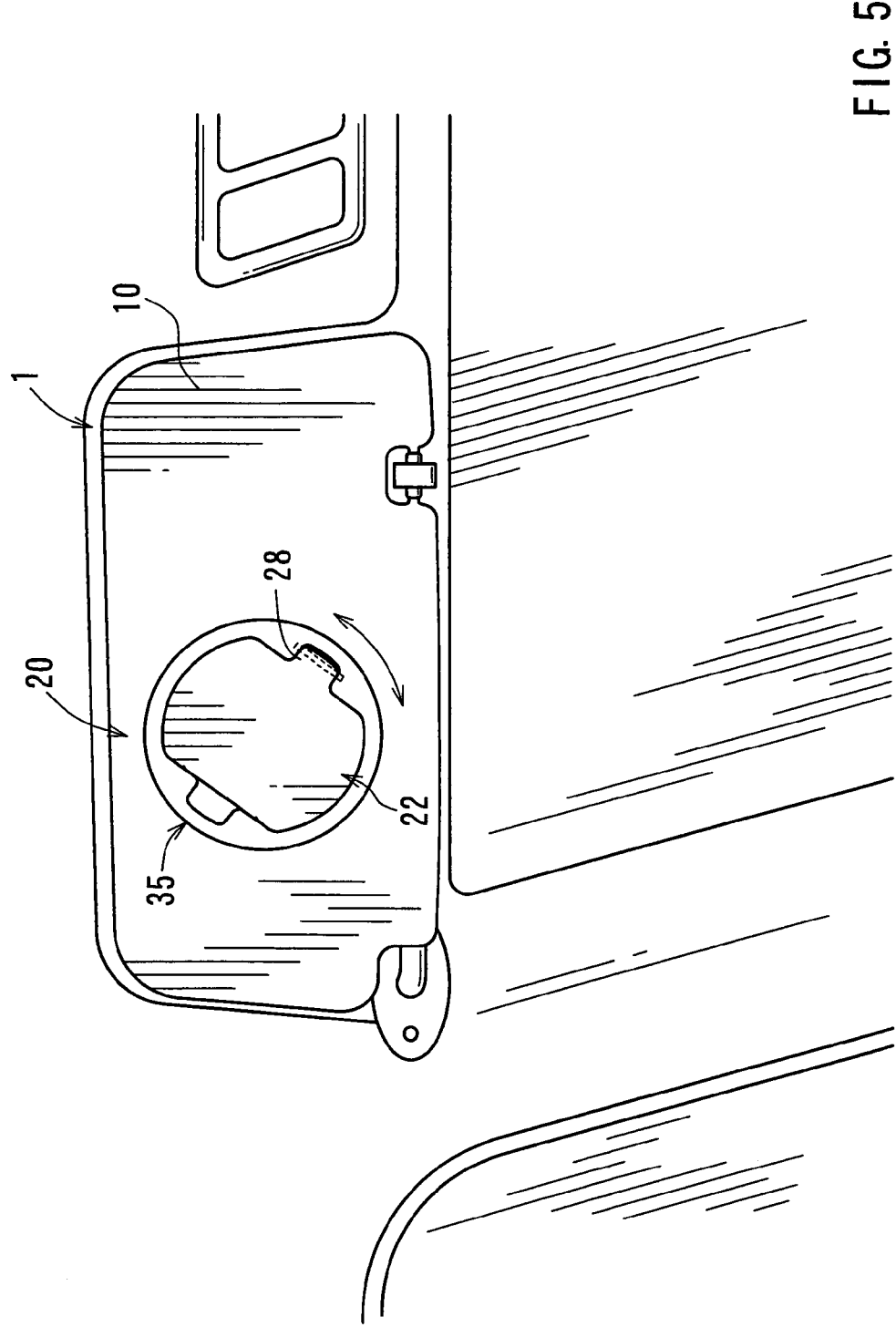
FIG. 5 is a plane view of the sun visor for a vehicle shown in FIG. 1 when the rotatable holder is rotated against the sun visor body.

The mirror unit 20, being in a stored position, may appear as shown in FIGS. 1 and 5. A cross-section of the mirror unit 20 in the stored position is shown in FIG. 3. More specifically, the mirror holder 22 is stored within the housing part 39 of the rotatable attachment 35 and does not protrude beyond the rotatable attachment 35. The mirror holder 22 is stably held in a stored position by the interface between the engaging concave parts 31 and the corresponding engaging convex parts 45 of the rotatable attachment 35. However, the rotatable attachment 35 can be located at any rotatable position, and may be at any random position other than the positions shown in FIGS. 1 and 5.

When using the mirror unit 20, accordingly arrange the rotatable attachment 35 to a convenient rotatable position in order to rotate the mirror holder 22 to the used position. Inserting a finger into the concave part 41 and adding a force toward the used position to the thickness part of the mirror holder 22, releases the engagement between the engaging concave parts 31 and the corresponding engaging convex parts 45 and causes the mirror holder 22 to move to the used position. In the present embodiment, the mirror holder 22 can be stably retained in a preferable position by the friction of the pin 51 against the rotatable attachment 35 and the penetrating channel 29 of the mirror holder 22. Therefore, the mirror holder 22 can be held, not only at a completely opened position, but also at any rotatable position (i.e., protruding angle) such as the positions shown by the chain lines in FIG. 4. After opening the mirror holder 22, adjusting the right-and-left angle by rotating the rotatable attachment 35 enables a passenger to watch any preferable area of the vehicle interior via the mirror 24.

For example, when a passenger is checking their own face or clothes, the rotatable attachment 35 may preferably be at the rotatable position shown in FIG. 1. Further, by adjusting the angle of the mirror holder 22 relative to the sun visor body 10, the height of a location reflected by the mirror 24 may be adjusted. Alternatively, when checking on another passenger sitting diagonally to the rear, such as in the rear seat or the middle seat of a vehicle, the mirror holder 22 may be arranged in a position rotated 180° relative to the rotatable position shown in FIG. 1, where FIG. 1 is characterized in that the attached part 28 is located at the lowest position relative to the sun visor body 10.

When placing the mirror holder 22 back into the stored position, a passenger may push the mirror holder 22 toward the rotatable attachment 35 so that the engaging convex parts 45 interface with the corresponding engaging concave parts 31. The mirror holder 22 is then stored within the housing part 39.

In the mirror unit 20 of the present sun visor for vehicle 1, the rotatable attachment 35 is formed into a substantially circular shape, and uses the circular engaging construction to be rotatably held in position. The attached part 28 is simply rotatably attached to the rotatable attachment 35. Therefore, the mirror unit 20 does not need any complicated components such as an axis member for rotation. On the contrary, the mirror holder 22 is easily and rotatably fixed to the rotatable attachment 35 by the pin 51. Consequently, the sun visor for vehicle 1 is a sun visor having a mirror with a simple construction and with an easy angular adjustment performed by simple operation.

In particular, it is possible to adjust the mirror unit 20 to a preferable angle while the sun visor body 10 is held at the hold position. Therefore, this sun visor for vehicle 1 enables the use of the mirror 24 while preventing a substantial decrease in the field of vision of the passenger. Moreover, because the rotatable attachment 35 can rotate in wide angular range regardless of the thickness of the sun visor body 10, a wide angular adjustment range may be secured in the right-and-left direction of the mirror 24. In addition, with regard to an up-and-down direction, the mirror may be rotate relative to the sun visor body 10 from a position parallel to the attached face of the sun visor body 10 to protrude at an obtuse angle, for example, as shown in FIG. 4. Therefore, the mirror 24 of the mirror unit 20 is adjustable within a wide angular range and can be placed in a desired position in order to watch almost every part of the vehicle interior.

Figure 10:
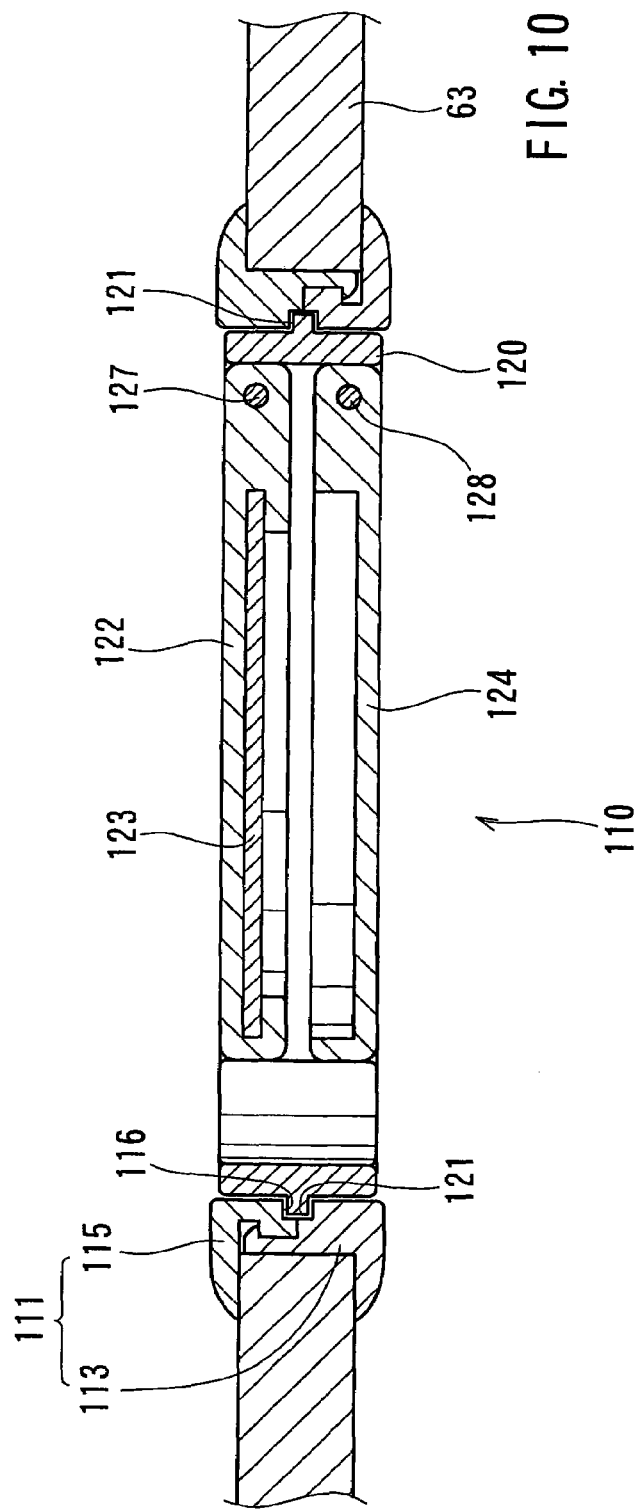
FIG. 10 is a cross-sectional view showing another modified example of the sun visor for a vehicle shown in FIG. 6.
Figure 11:
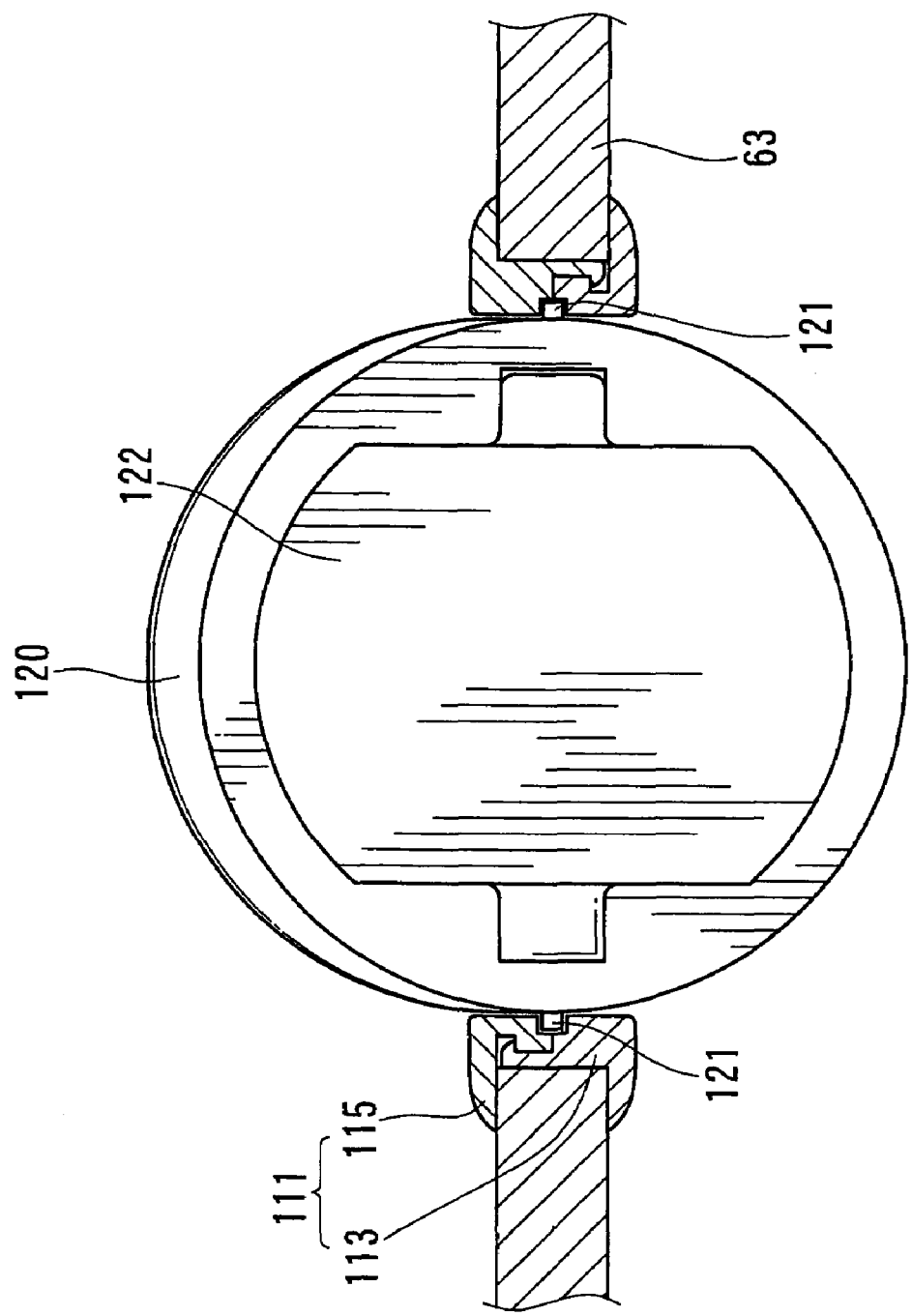
FIG. 11 is a partial cross-sectional view of the sun visor for a vehicle shown in FIG. 10 while the rotatable attachment is being rotating.

A possible modified embodiment of the present teachings not shown in detail, but similar in part to FIGS. 10 and 11, provides a mirror unit including a rotatable attachment 35, a mirror holder 22, and a holding rotatable member. The holding rotatable member may rotatably hold the rotatable attachment 35. When the holding rotatable member is flush with the sun visor body, the holding rotatable member allows the rotation of the rotatable attachment 35 about an axis perpendicular to the sun visor body 10. The mirror holder 22 is rotatable about a rotatable axis substantially parallel to the sun visor body 10 when the holding rotatable member is flush with the sun visor body 10. And the hold rotatable member is also rotatably attached to the sun visor body 10 about an axis extending parallel to the sun visor body 10 (similar to the rotation shown in FIG. 11). In this embodiment, for example the hold rotatable member may hold the rotatable attachment 35 with the same configuration as the unit support 12 of the above embodiment. Accordingly, the friction increment member also arranged between the rotatable attachment and the hold rotatable member, or between the hold rotatable member and the sun visor body.

An embodiment for attaching such a hold rotatable member to the sun visor body 10 will be described next. A rotational axis along a straight line extending through the center of the hold rotatable member may be structured at the periphery of the hold rotatable member as two protruding circular cylinders. Conversely, corresponding holes or the penetrating holes may be provided in the sun visor body for rotatably holding the hold rotatable member (the conduit of FIGS. 10 and 11 is not provided in this embodiment). At least one bearing may be provided within a depth of these holes or penetrating holes. Accordingly, a structure causing friction may be provided to either the bearing or to the rotation axis (configured as the two protruding circular cylinders and their corresponding holes), in order to enable the hold rotatable member to rotate about the rotational axis and to maintain any preferable rotated positions relative to the sun visor body.

According to this embodiment, it is possible to adjust the height position of the mirror. Further, in another embodiment, the hold rotatable member can rotate to positions along both side surfaces of the sun visor body. In this embodiment, the mirror can be used to adjust to various directions when the sun visor body 10 is in either the hold position or a sun shading position.

Further, as one of other embodiments, the mirror unit can be provided on the other surface of the sun visor body 10, i.e., the surface facing the interior of the vehicle compartment when the sun visor is placed in a sun shading position. In this embodiment, preferably, an additional mirror may be provided at the bottom of the rotatable attachment (corresponding to bottom part 49 of the previous embodiment). Combining the reflections of two mirrors may be done in order for a front seat passenger to clearly watch all of the passengers in the rearward seats.

Further, the rotatable attachment is provided just rotatably along the attached face of the sun visor body. For example, the attaching part may be formed as plural parts forming one circle. More particularly, the attaching part can be formed as a circular cylindrical part protruding from the bottom part of the housing part for the mirror holder. The attaching part can also be formed as plural protruding blocks positioned on one circle. In these embodiments, the mirror holder is not limited to a circular shape, but may be formed in any preferable shape. In this case, the mirror holder is provided above the surface of the sun visor body. With such a configuration, the rotatable attachment may be provided so that the mirror unit can be displaceable between a position in the plane of the sun visor body and a position extended away from the sun visor body. In other words, the center of rotation for the rotatable attachment can be positioned away from the center of the mirror holder, i.e. the mirror unit. Moreover, the rotatable attachment without a housing part for the mirror holder can also be used. For example, a rotatable attachment can be applied to an embodiment such that the mirror unit is mounted on the surface of the sun visor body facing toward the inside of vehicle interior at a hold position of the sun visor body. In this embodiment, by placing the mirror holder at a position elongated from the sun visor body in a stored position, and arranging the sun visor body at a shading position, the mirror can be used as a vanity mirror.

Alternatively, in the embodiment shown in FIGS. 1 to 3, the rotatable attachment without the bottom part can be utilized. In such an embodiment, a part of the sun visor body correspond to the inside of the rotatable attachment may be formed as a penetrating hole. In this case, when the mirror holder is at a stored position, by arranging the sun visor body at a use or shading position, for example, the position along the front windshield, the passenger will able to see the mirror from the side surface of the sun visor body opposite to the attached face. Therefore, the mirror may be used as an ordinal vanity mirror when the mirror holder is positioned in a stored position.

The friction increment member may also be provided between the attaching part and the detents, for example. Further, the friction increment member can be a member with rough surface and arranged between the sun visor body and the rotatable attachment. Instead of the friction increment member, configurations causing preferable amounts of friction force may be applied, for example, the attaching part may be formed thicker than the thickness needed for the engagement with the detents.

Figure 6:
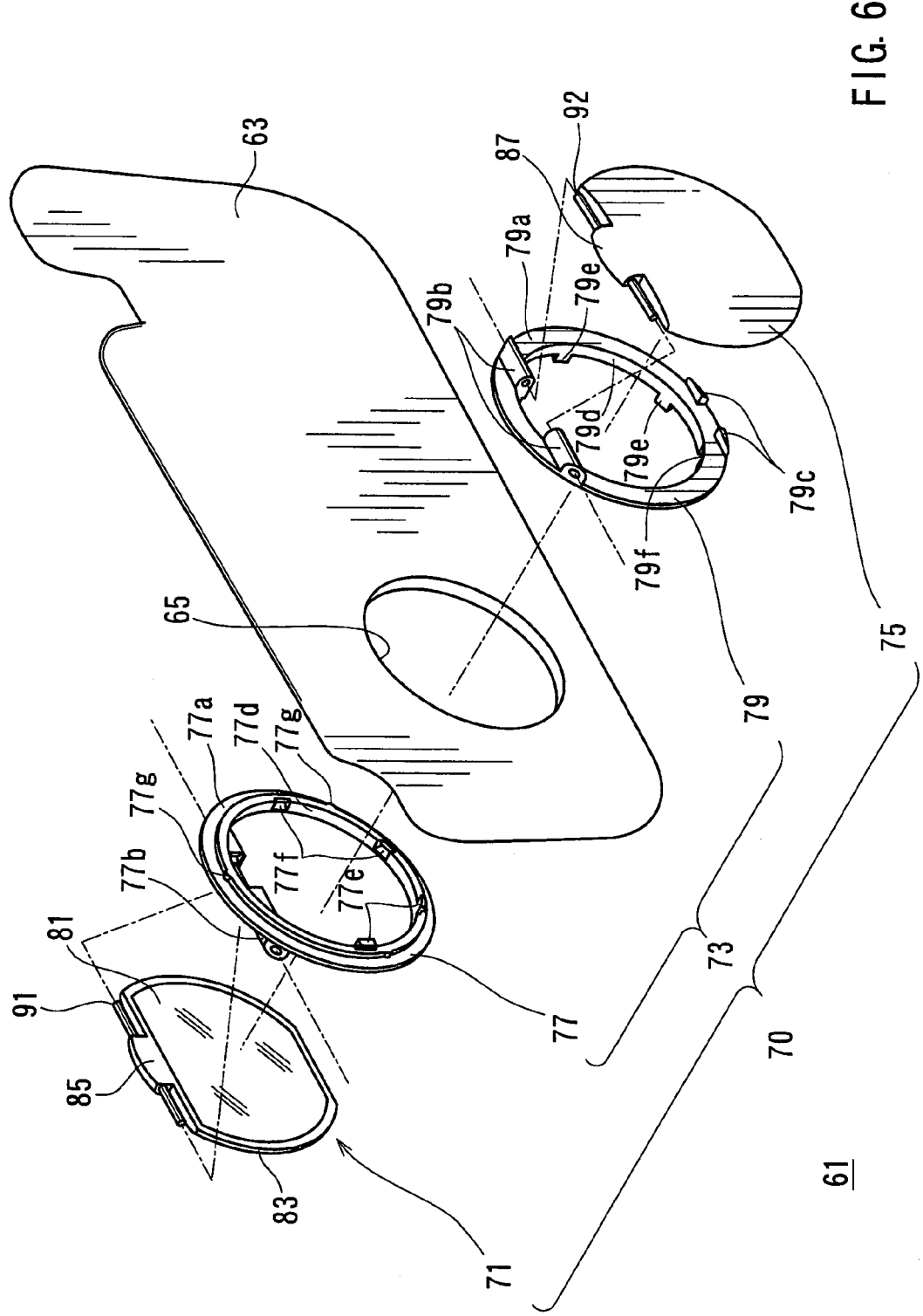
FIG. 6 is an exploded perspective view of another representative sun visor for a vehicle according to the present teachings.
Figure 7:
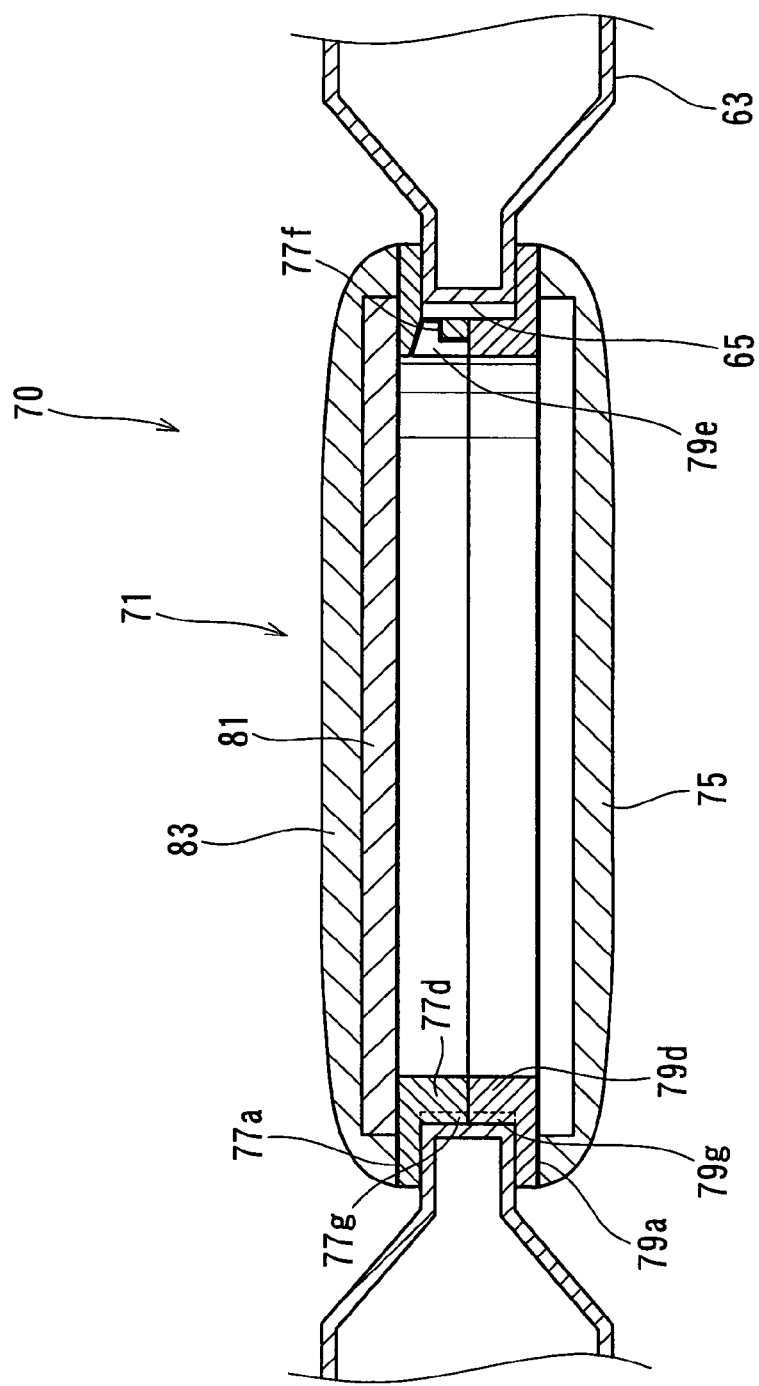
FIG. 7 is a cross-sectional view similar to FIG. 3 but showing the mirror unit and sun visor for a vehicle from FIG. 6.
Figure 8:
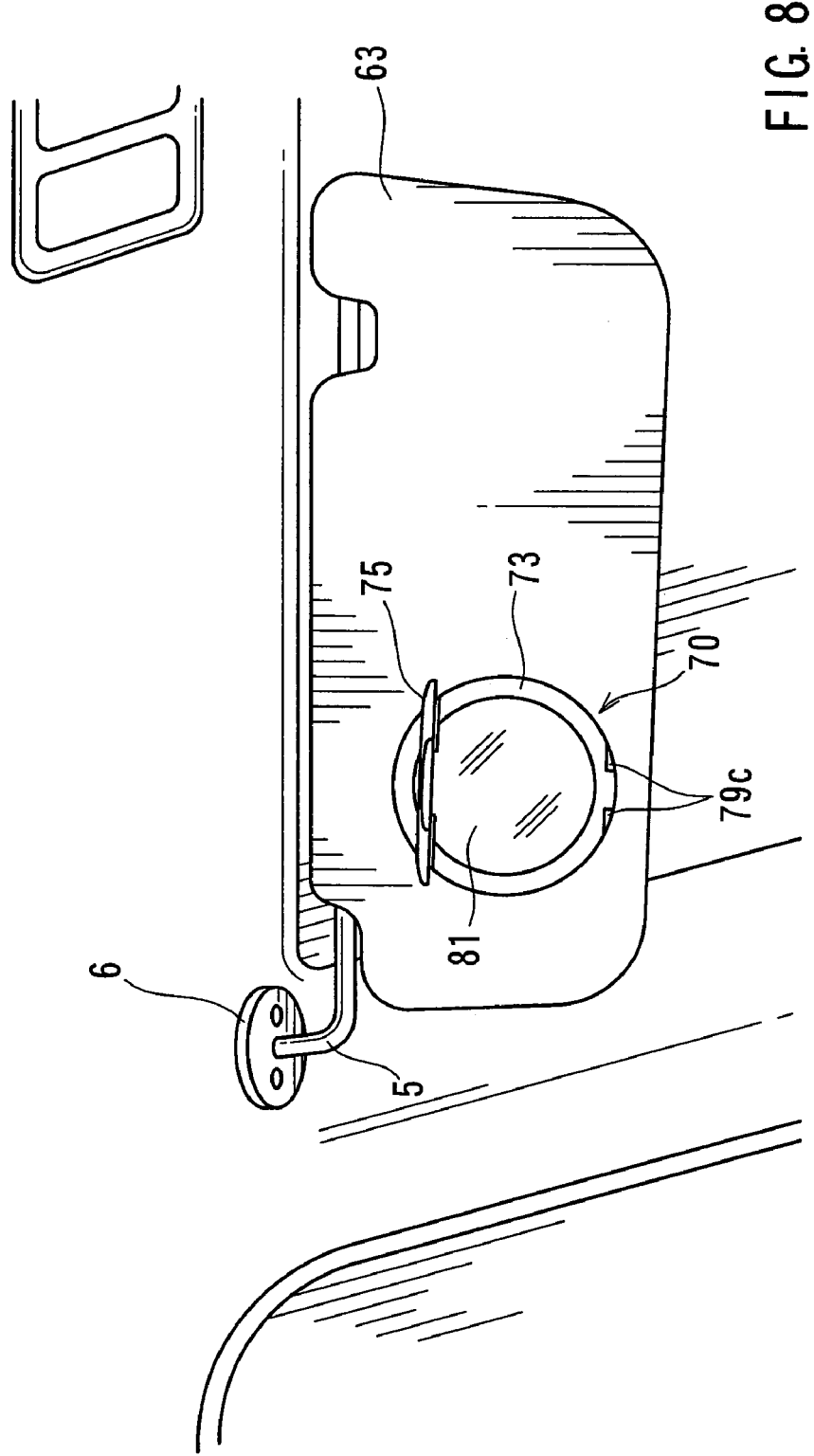
FIG. 8 is a plane view of the sun visor for a vehicle shown in FIG. 6 when the sun visor is in a used position.

As another embodiment of the present teachings, FIGS. 6 to 8 show a sun visor for vehicle 61 having a sun visor body 63 with a penetrating hole 65 and a friction increasing member made of an inelastic material. As shown in FIG. 8, the sun visor for vehicle 61 has the same bracket 6 and the support axis 5 as the sun visor for vehicle 1 shown in FIG. 1. Further, the sun visor for vehicle 61 includes a sun visor body 63 and a mirror unit 70. The sun visor body 63 is substantially the same as the sun visor body 10 of the first embodiment shown in FIG. 1, except that the sun visor body 63 has a circular penetrating hole 65, as shown in FIG. 6.

The mirror unit 70 includes a mirror holder 71, a rotatable attachment 73, and a lid 75. In the present embodiment, the mirror unit 70 directly attaches to the sun visor body 63 without a unit support.

The mirror holder 71 includes a cover 83 and a mirror 81, and is substantially the same as the mirror holder 22 of the above embodiment. The mirror 81, as shown in FIG. 6, is formed in a shape similar to the first embodiment, configured as the central part of a circular disc cut by two parallel lines. Consequently, the mirror 81 has two opposite straight sides that are parallel with each other, and two other opposing sides that are formed as circular arcs having the same center and the same radius. As shown in FIG. 6, the cover 83 covers the periphery and the entire back surface of the mirror 81. The cover 83 has an attached part 85. The attached part 85 is extended from the center of one of the straight sides of the mirror 81, in a direction parallel to the surface of the mirror 81. A penetrating channel (not shown) is formed in the attached part 85 to allow the passage of an inserted pin 91, as shown in FIG. 6.

The lid 75 has a shape analogous to the cover 83 except the lid 75 may not include a mirror. In another embodiment, the lid 75 may be replaced with another cover 83. However, in this embodiment, the lid 75 is a plate-like member configured in the shape of the central part of a circular disc cut by two parallel lines. The circular disc may have the same radius as the circular disc of the cover 83. Further, the lid 75 has an attached part 87 that is extended in the same plane of the lid 75 from the center of one of the straight sides of the lid 75. A penetrating channel (not shown) is formed in the attached part 87 to allow the passage of an inserted pin 92.

The rotatable attachment 73 is annularly formed in the present embodiment. The rotatable attachment 73 includes two half members contacting with each surface of the sun visor body 63, the mirror-side member 77 and the lid-side member 79. The mirror-side member 77 and the lid-side member 79 both respectively include a plate part, 77a and 79a. The two members 77 and 79 also respectively include a thin plate ring and height part, 77d and 79d, cylindrically extending perpendicular to each corresponding plate part, 77a and 79a, along the inner circumference of each plate part, 77a and 79a.

Each plate part, 77a and 79a, forms a part of the surface of the sun visor for vehicle 61 on opposite sides of each height part, 77d and 79d. Further, in order to connect the mirror holder 71 and the lid 75 to each plate part, 77a and 79a, pin supports 77b and 79b are provided. Each set of pin supports, 77b and 79b, includes two tubular sections mounted at two locations of each plane part, 77a and 79a. The two tubular sections are positioned on a line running across the top of the mirror side member 77 and the lid side member 79. The two tubular sections of each set of pin supports, 77b and 79b, have same center axis and the same radius. Each attached part, 85 and 87, of the respective mirror holder 71 and the lid 75 are inserted between the corresponding two tubular parts of the pin supports, 77b and 79b. Each pin, 91 and 92, are respectively inserted through the corresponding pin supports, 77b and 79b, and the inserted attached part, 85 and 87. Consequently, the mirror holder 71 and the lid 75 are rotatably attached to the rotatable attachment 73. The mirror holder 71 is rotatable between a stored (i.e., closed) position parallel to the plane part 77a and the used position at a desired angle relative to the plate part 77a. The lid 75 is also rotatable between a closed position parallel to the plate part 79a and an opened position at some desired angle relative to the plate part 79a.

Further, each plate part, 77a and 79a, has tabs 79c (not shown in the mirror-side member 77). In the present embodiment, the tabs 79c are preferably two convex protrusions located along outer circumference of the plate part 79a. The tabs 79c may removably hold the lid 75 attached to the lid-side member 79 by interfacing with the edge of the lid 79 on the side opposite to the attached part 87. The same principles apply to the tabs provided on the mirror-side member 77.

As shown in FIG. 7, the height part 77d of the mirror-side member 71 and the height part 79d of the lid-side member 79 are formed so as to engage and interface with one another. As shown in FIG. 6, each height part, 77d and 79d, have pluralities of respective fixing tabs, 77e and 79e, projecting in the height direction (the axial direction of the cylinder) and corresponding pluralities of tab supports, 77f and 79f, positioned at predetermined intervals. The tab supports, 79f and 77f, are respectively arranged so as to directly oppose the corresponding fixing tabs 77e, 79e during assembly. As shown in FIG. 7, the fixing tabs, 77e and 79e, have less thickness than each height part, 77d and 79d, and also have leg portions extending flush along the inner circumference of each height part, 77d and 79d. An engaging device is formed at the top edge of each leg portion with a structure thicker than the remaining lower section of each leg portion. Further, the tab supports 77f and 79f include concave sections of the inner circumference of each height part, 77d and 79d, with engaging parts corresponding to and engageable with the engaging devices of the fixing tabs 77e and 79e. As shown in FIG. 7, the fixing tabs 77e and 79e and the corresponding tab supports 77f and 79f are engaged with each other so as allow the top edge of the height part 77d to directly oppose and face the top edge of the height part 79d. Consequently, integrating the mirror-side member 77 with the lid-side member 79.

Further, as shown in FIGS. 6 and 7, each height part 77d and 79d may have a number of respective friction increment members, 77g and 79g, located at predetermined intervals about their outer circumferences. In the present embodiment, the friction increment members 77g and 79g are formed as protrusions that extend radially outward from the thickness of each height part, 77d and 79d.

As shown in FIG. 7, the rotatable attachment 73 is attached to the sun visor body 63 by inserting the height part 77d of the mirror-side member 77 and the height part 79d of the lid-side member 79 into the penetrating hole 65 of the sun visor body 63 from both sides and connecting them together. As a result, the rotatable attachment 73 is rotatably provided in the penetrating hole 65 along the attached part of the sun visor body 63, i.e. within the plane parallel to the surface of the sun visor body 63 attached to the mirror holder 71. Further, the friction increment members, 77g and 79g, are pressed against the inner periphery of the penetrating hole 65 and function so as to increase the friction force against the rotation of the rotatable attachment 73.

The mirror unit 70 of the sun visor for vehicle 61 of the present embodiment can be used in the same manner as the mirror unit 20 of the first embodiment. Further, as shown in FIG. 8, putting the mirror holder 71 in a stored position and arranging the sun visor body 63 in a shading position, enables the mirror 81 to be used as a common vanity mirror by rotating the lid 75 to an open position. Particularly, because of the lid 75, the mirror 81 is shielded from the passenger when not used as a vanity mirror. This construction enables the lid 75 to protect the mirror 81, as well as to prevent annoying reflections or reflecting light on the passengers. Moreover, because the lid 75 is integrated into the mirror unit 70, passengers can rotate the mirror 81 by using the lid 75 as a rotation handle. The rotating operation using the lid 75 will also help to adjust the mirror 81, particularly a noncircular mirror, in order to watch desirable areas.

The lid 75 may be fixedly provided on the sun visor body 63. Further, for the purposes of protecting the mirror or protecting a passenger from a broken mirror, a transparent protecting plate may be added to cover the inner space of the rotatable attachment 73.

Figure 9:
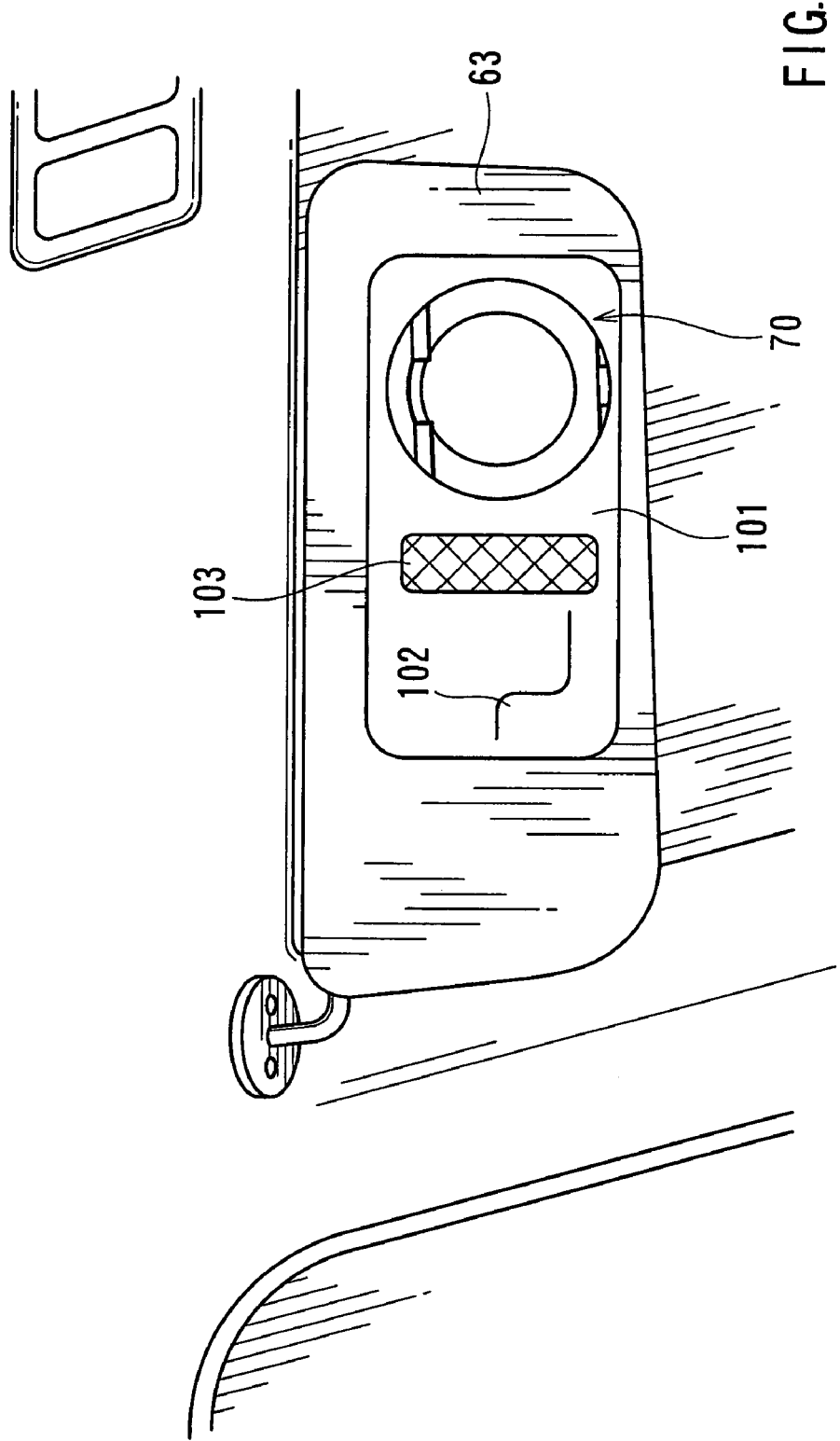
FIG. 9 is a plane view showing a modified example of the sun visor for a vehicle shown in FIG. 6.

FIG. 9 shows other embodiment having a unit support 101 and other additional constituent members. The unit support 101 is fixed to the sun visor body 63. The rotatable attachment 73 of the mirror unit 70 is rotatably attached to the unit support 101. Specifically, the same concavity and the convexity of the interface between the sun visor body 63 and the rotatable attachment 73 of the previous embodiment are formed to both the inner circumferential face of the unit support 101 and the outer circumference of the rotatable attachment 73. In addition to the mirror unit 70, card pockets 102 and a vanity lamp 103 are mounted to the unit support 101. This type of sun visor for vehicle may be manufactured by initially placing the mirror unit 70 and other constituent members on the unit support 101 and then attaching the unit support 101 to the sun visor body 63. Therefore, the assembly steps can be simplified.

As a further modified embodiment, the sun visor with a hold rotatable member 111 is shown in FIGS. 10 and 11. This mirror unit 110 has the hold rotatable member 111 coupled with a unit support. The hold rotatable member 111 may comprise two of halved members, 113 and 115. The halved members 113 and 115 are attached to the penetrating hole 65 of a sun visor body 63 by the same engaging type of construction as that used with the mirror-side member 77 and the lid-side member 79 (shown in FIGS. 6 and 7). Further, the inner circumference of each top edge of the halved members 113 and 115 may be formed into a circular conduit 116 when the halved members 113 and 115 are engaged and unified.

A rotatable attachment 120 is formed as a circular cylinder. Circular columnar axes 121 project along a diametric direction from the outer circumference of the rotatable attachment 120. These axes 121, as shown in FIGS. 10 and 11, are inserted in the conduct 116 of the hold rotatable member. The axes 121 are displaceable along the conduct 116 as well as rotatable about the axes 121 within the conduct 116. Accordingly, the friction increment member may be added to the outer circumference of the axes 121 in order to increase the frictional resistance opposing the displacement and the rotation of the rotatable attachment in the conduct 116. The rotatable attachment 120 may have a circular ring member including a height double the amount of the rotatable attachment 35 shown in FIGS. 1 to 5. The rotatable attachment 120 may also not include a bottom part. Further, two penetrating holes (that are not shown) are provided at the positions corresponding to pins 127 and 128, connected to the wall part of the rotatable attachment 120. A mirror holder 122 is the same as the mirror holder 22 shown in FIGS. 1 to 5. The lid 124 is similar to the mirror holder 122 except that the lid 124 does not include a mirror. The mirror holder 122 and the lid 124 are rotatably fixed via pins 127 and 128.

In this embodiment, the mirror unit 110 can be used in the same manner as that of the mirror unit 70 of the sun visor for vehicle 61 shown in FIGS. 6 to 8. Further, the mirror 123 can be used at a lower position while the sun visor body 63 is arranged in a shading position. More specifically, by arranging the sun visor body 63 at a shading position and rotating the rotatable attachment 120 around the axes 121 against the sun visor body 63, the mirror holder 122 is directed to the inside of vehicle interior. Then the mirror holder 122 is rotated into the used position. This operation enables a passenger to arrange the mirror holder 122 when the sun visor body 63 is lowered into a shading position. Subsequently, the passengers can use the mirror 123 as a vanity mirror. In this manner, a passenger will be able to see their reflection in the mirror while facing toward the front of the vehicle. Further, by using the rotatable attachment as the hold rotatable member, there may be a decreased part count.

Nevertheless, with regard to the embodiments shown in FIGS. 6 to 11, various modifications and changes can be applied in ways similar to the embodiment shown in FIGS. 1 to 5. For example, an additional mirror may be provided with the sun visor for a vehicle in addition to the mirror located in the mirror holder. The additional mirror may be located on the face opposite to the attached face for the mirror holder of the sun visor body. In a situation where the sun visor body includes a penetrating hole, an additional mirror may also be provided on the bottom of the rotatable attachment, that is not facing the mirror holder. Alternatively, by adding mirrors to the lid 75 or 124, obtains additional mirror holders.

The invention claimed is:

1. A sun visor for a vehicle comprising:
   a sun visor body defining a plane, and
   a mirror unit attached to the sun visor body, wherein the mirror unit includes:
      a rotatable attachment that is rotatable about an axis that is substantially perpendicular to the plane of the sun visor body, said rotatable attachment defining a plane and lying within the visor body during use, and
      a mirror holder including a minor and rotatably connected to the rotatable attachment around a rotatable axis,
      wherein the rotatable axis is substantially parallel to the plane of the rotatable attachment and lies within the rotatable attachment, and
      wherein the mirror holder is displaceable between a stored position that lies substantial within the rotatable attachment and a used position in which it protrudes from the sun visor body at an angle.

2. The sun visor for a vehicle described in claim 1, wherein the mirror unit is provided on one face of the sun visor body,
   wherein the face is directly opposed to an interior of a vehicle cabin when the sun visor body is attached to a ceiling face of the vehicle cabin and when the sun visor body is arranged in a stored position along the ceiling face.

3. The sun visor for a vehicle described in claim 1, wherein a fiction increment member is mounted between the rotatable attachment and the sun visor body,
   wherein the friction increment member increases a friction force opposing the rotation of the rotatable attachment relative to the sun visor body.

4. A sun visor for a vehicle comprising a sun visor body defining a plane and a mirror unit attached to the sun visor body, wherein
   the mirror unit includes:
      a rotatable attachment that is rotatable about an axis that is substantially perpendicular to the plane of the sun visor body, said rotatable attachment defining a plane, and
      a mirror holder including a mirror and rotatably connected to the rotatable attachment around a rotatable axis,
      wherein the rotatable axis is substantially parallel to the plane of the rotatable attachment,
      wherein the mirror holder is displaceable between a stored position that lies substantially within the rotatable attachment and a used position in which it protrudes from the sun visor body at an angle; and
      wherein the sun visor body has a concave unit support with a circular inner circumference.

5. The sun visor for a vehicle described in claim 4, wherein the rotatable attachment has a circular outer circumference, and
   wherein the rotatable attachment is rotatably held by engaging the circular inner circumference of the concave unit support with the circular outer circumference of the rotatable attachment.

6. The sun visor for a vehicle described in claim 1, wherein the sun visor has a hold position in which the sun visor is positioned against the ceiling of the vehicle, and a shading position, in which sun visor is positioned along the windshield of the vehicle: said sun visor body having a first side that faces the interior of the vehicle when the sun visor is disposed in the hold position and a second side that faces the interior of the vehicle when the sun visor is disposed in the shading position. wherein when the mirror holder is located in the stored position, the mirror is visible from said second side of the sun visor body.

7. The sun visor for a vehicle described in claim 6, wherein a penetrating hole is formed in the sun visor body, and
wherein the mirror is visible from the second side of the sun visor body via the penetrating hole while the mirror holder is located in the stored position.

8. The sun visor for a vehicle described in claim 6, wherein a lid is provided on the second side of the sun visor body, and
wherein the lid is displaceable between an open position at which the mirror is visible and a closed position shielding the mirror.

9. The sun visor for a vehicle described in claim 6, wherein the rotatable attachment holding the mirror unit is switchable between a position in-plane of the sun visor body and a position elongated from the sun visor body.

10. The sun visor for a vehicle described in claim 1,
wherein the sun visor further includes a holding member holding the rotatable attachment such that the rotatable attachment is rotatable about the axis that is substantially perpendicular to the plane of the sun visor body is further rotatable relative to the holding member around an axis that is substantially parallel to the sun visor body.

11. The sun visor for a vehicle described in claim 10, wherein the holding member functions as a unit support in which the mirror unit is stored.

12. The sun visor for a vehicle described in claim 11, wherein the rotatable attachment has a circular ring part and an axis extending in the direction of a diameter of the circular ring part, and wherein the holding member is formed as a circular ring attached to a penetrating hole of the sun visor body and has a circular conduit along an inner circumference of the circular ring, and wherein the rotatable attachment is attached to the sun visor body by engaging the axis with the conduit so that the axis is displaceable and rotatable within the conduit.

13. A sun visor for a vehicle, comprising a sun visor body, said sun visor body defining a plane, and a mirror unit attached to the sun visor body, wherein the mirror unit includes:

a rotatable attachment that is rotatable about an axis that is substantially perpendicular to the plane of the sun visor body,
wherein the rotatable attachment has a central axis and a radius about the central axis, and
wherein the central axis of the rotatable attachment substantially coincides with the axis of rotation of the rotatable attachment; and a mirror holder including a mirror and rotatably connected to the rotatable attachment around a rotatable axis,
wherein the rotatable axis is substantially parallel to the plane of the rotatable attachment, and
wherein the mirror holder is displaceable between a stored position that lies substantially within the rotatable attachment and a used position in which it protrudes from the sun visor body at an angle.

14. The sun visor for a vehicle described in claim 13, wherein the rotatable attachment has a substantially circular radially outer circumference.

15. The sun visor for a vehicle described in claim 14, wherein the rotatable attachment has a ring shape.

16. The sun visor for a vehicle described in claim 14, wherein the sun visor body has a concave unit support with a circular inner circumference.

* * * * *